United States Patent [19]

Ford et al.

[11] 4,233,748
[45] Nov. 18, 1980

[54] HOLE ALIGNMENT PROBE

[75] Inventors: Daniel E. Ford, Brandon, Fla.;
Jeffrey A. Pyle, Greer, S.C.

[73] Assignee: Westinghouse Electric Corp.,
Pittsburgh, Pa.

[21] Appl. No.: 58,894

[22] Filed: Jul. 19, 1979

[51] Int. Cl.³ .............................................. G01B 7/31
[52] U.S. Cl. .............................. 33/180 R; 33/185 R;
33/286; 33/DIG. 13
[58] Field of Search ......... 33/180 R, 185 R, DIG. 13,
33/286, 169 C

[56] References Cited

U.S. PATENT DOCUMENTS

| | | | |
|---|---|---|---|
| 4,034,778 | 7/1977 | Sage et al. | 33/DIG. 13 |
| 4,060,906 | 12/1977 | Heizmann | 33/DIG. 13 |
| 4,067,115 | 1/1978 | Beaton | 33/DIG. 13 |

*Primary Examiner*—Willis Little
*Attorney, Agent, or Firm*—F. J. Baehr, Jr.

[57] ABSTRACT

Hole alignment probes utilizing strain gages spaced 90° apart to indicate the extent and direction of misalignment of holes disposed in substantial alignment.

9 Claims, 4 Drawing Figures

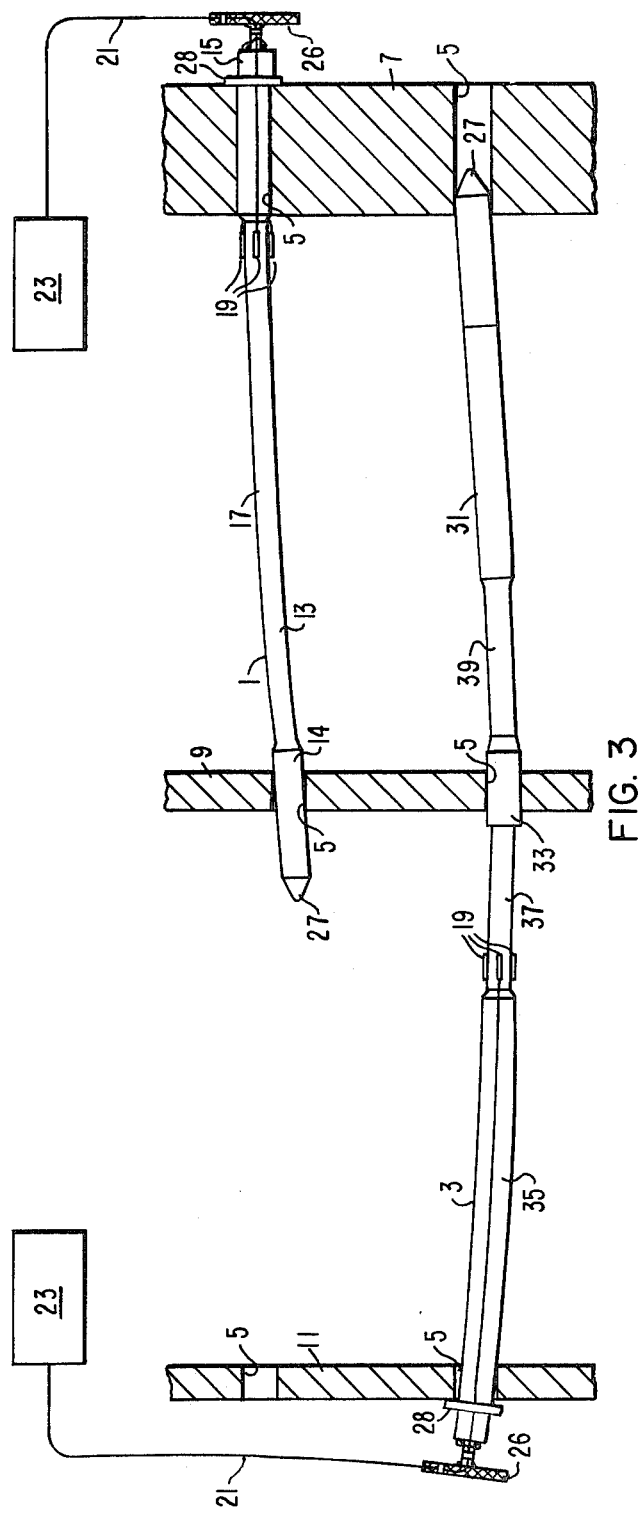
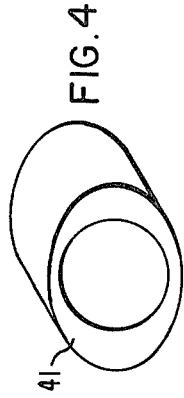
FIG. 3
FIG. 4

4,233,748

HOLE ALIGNMENT PROBE

BACKGROUND OF THE INVENTION

This invention relates to a hole alignment probe and more particularly to such a probe for indicating the misalignment of holes in baffles, tube support plates and tubesheets of heat exchangers.

In manufacturing steam generators with improved tube support plates and flow distribution baffles difficulties were encountered in installing the tubes due to a combination of elements including run out of the holes drilled in the tubesheet, bowed tube support plates or baffles and the small distances between the first baffle and the tubesheet. The probe hereinafter described is utilized to align the baffles and tubesheet and to identify and determine the extent of misalignment on certain holes so that they can be relieved by countersinking or counterboring.

SUMMARY OF THE INVENTION

A hole alignment probe for determining the misalignment of holes in spaced-apart plates, when made in accordance with this invention, comprises an elongated rod having at least two lands slightly smaller in diameter than the holes and spaced generally the same as the plates. The elongated rods also have a turn-down portion between the lands. Disposed on the turn-down portion of the elongated rod are at least two strain gages spaced 90 degrees apart and cables for connecting the strain gages to a meter. Cable runs are disposed in one of the lands to bring the cables through the lands without interfering with the fit between the land and the associated hole. The probe also comprises means for determining the orientation of the strain gages so that when inserted in aligned holes in adjacent plates the amount and orientation of the misalignment between the holes can be determined by determining the strain registered by the strain gages.

BRIEF DESCRIPTION OF THE DRAWINGS

The objects and advantages of this invention will become more apparent from reading the following detailed description in connection with the accompanying drawings, in which:

FIG. 3 is a partial sectional view of a heat exchanger showing the probes; and

FIG. 4 is a sleeve utilized with odd-shaped holes.

DESCRIPTION OF THE PREFERRED EMBODIMENT

Figure 1:
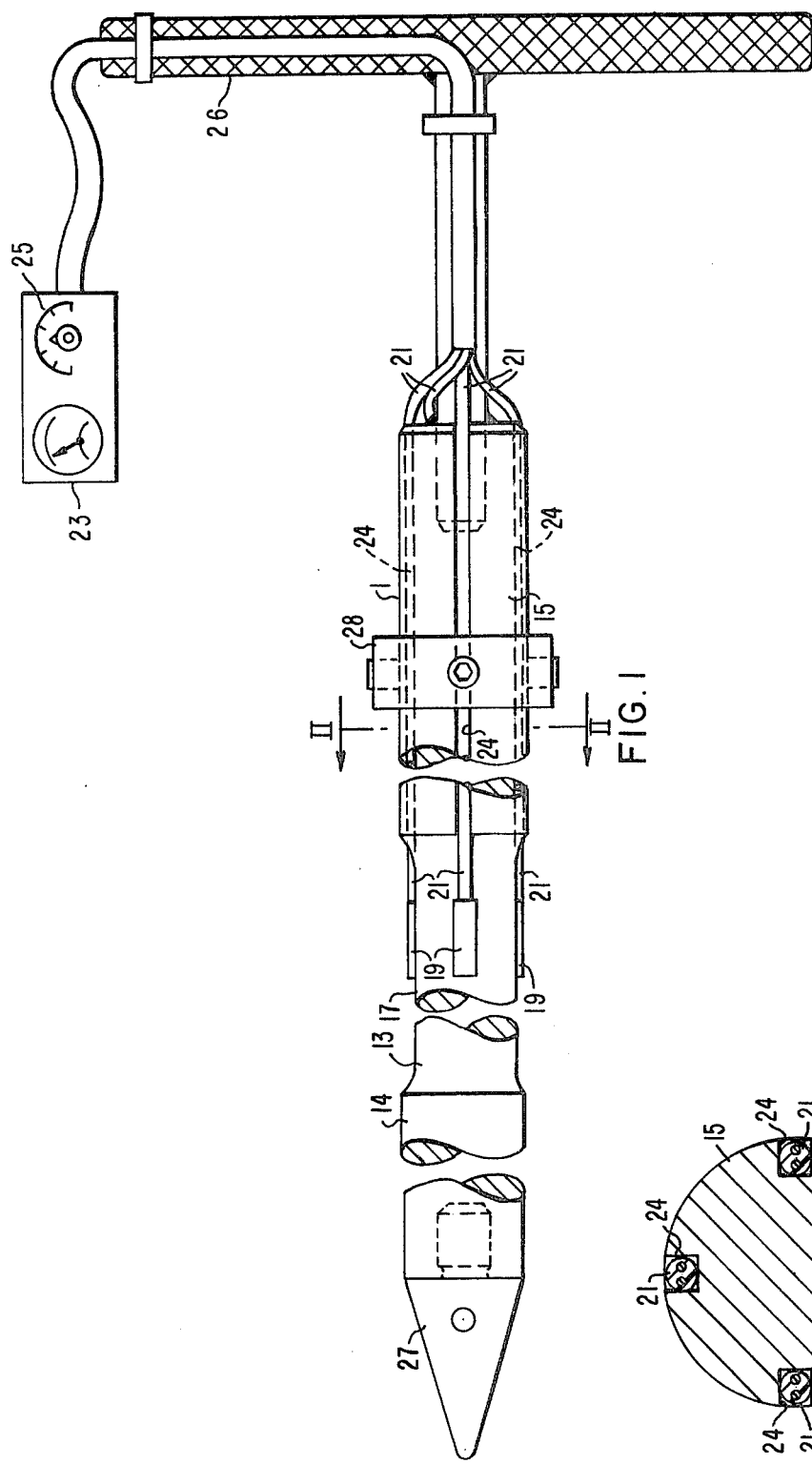
FIG. 1 is an elevational view of a hole alignment probe made in accordance with this invention.

Referring now to the drawings in detail and in particular to FIG. 3 there is shown probes 1 and 3 for determining the misalignment of aligned holes 5 in a heat exchanger tubesheet or plate 7 baffle plate 9 and/or tube support plate 11 or other apparatus having aligned holes.

Figure 2:
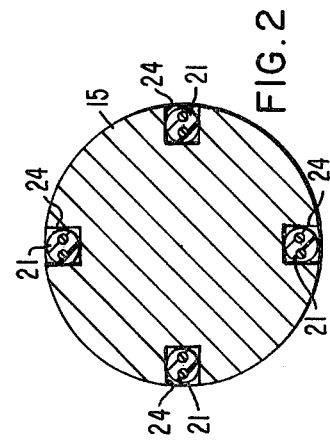
FIG. 2 is a sectional view taken on line II—II of FIG. 1.

The probe 1, as shown best in FIGS. 1 and 2, comprises an elongated rod 13 having at least two lands 14 and 15 slightly smaller in diameter than the aligned holes 5 and having a turned down portion 17 disposed between the lands 14 and 15. At least two, but preferably four, strain gages 19 are disposed on the turned down portion 17 adjacent one end and spaced 90 degrees apart. The 90 degrees spacing is required whether there are two or four strain gages. Each strain gage 19 has a cable 21, which is connected to a meter 23 that indicates the strain registered by the strain gage as the probe is bent due to misalignment of the holes 5. The land 15 on the trailing end of the probe 1 has a plurality of grooves 24 which act as a cable run for the cables 21 as they are brought out from the strain gages 19 to the meter 23. A switch 25 can be utilized to obtain readings from a single strain gage or pairs of opposing strain gages. A T-handle 26 or other indicating device is aligned with one pair of opposing strain gages 19 so that the strain gage orientation is known. The leading end 7 of the probe has a bullet shaped nose portion 27, which assists the probe in entering holes that are misaligned. A collar or other stop 28 is disposed on the trailing end of the probe to assist in aligning the lands with the tube sheet 7, baffle 9 and/or support sheet 11.

FIG. 3 also shows probe 3 which is similar to probe 1 but has three lands 31, 33, and 35 and two turned down portions 37 and 39. The strain gages 19 are disposed adjacent the trailing end of the trailing turned down portion 39. The other elements of the probe 3 are similar to those of probe 1.

Because misalignment is a common problem in heat exchangers often holes are relieved to receive tubes by making the hole oblong or some other odd shape that is non-symmetrical. To check the alignment of such holes a sleeve 41, as shown in FIG. 4, having a peripheral surface shaped to closely fit the odd-shaped hole is made with a centrally located bore which is adapted to receive the probe. Thus, the alignment of this odd-shaped hole can be checked with other regularly-shaped holes.

The operation of the probes is as follows. The collar or stop 28 is fixed to the land 15 or 35 so that the lands 15 and 17 or 31, 33 and 35 line up with the plates 7, 8 or 9 as the probes 1 or 3 is inserted in the hole 5. The bullet shaped nose 27 assists the probe 1 or 3 in entering misaligned holes 5 as the probe 1 or 3 is being inserted. The T-handle 27 is oriented with one of the orthogonal axis of the heat exchanger to provide known orientation of the strain gages 19 when the probe 1 or 3 is inserted to the collar 28. The signals from the strain gages 19 are recorded and compared with calibration curves to determine the magnitude and orientation of the misalignment utilizing simple trigonometric analysis. The probe 1 is utilized to determine the alignment of holes 5 in the baffle 9 with respect to the holes 5 in the tubesheet 7 and probe 3 is utilized to determine the alignment of holes 5 in the support plate 11, the baffle 9 and the tubesheet 7. To determine the alignment of the holes 5 in all three sheets both probes 1 and 3 must be utilized in each set of alignment holes. The probe 1 is inserted from the tubesheet 7 side of the heat exchanger and the probe 3 is inserted from the support plate 11 side of the heat exchanger. Probe 1 utilizes the very thick tubesheet 7 as the basis for determining the relative position of the hole 5 in the baffle 9 with respect to that of the tubesheet 7 and this in conjunction with the data obtained from probe 3 allows the determination of the relative positions of all three aligned holes.

What is claimed is:

1. A hole alignment probe for determining the misalignment of holes in spaced-apart plates, said probe comprising:

an elongated rod, said rod having at least three lands slightly smaller in diameter than the holes in said plates and spaced generally the same as said plates and having a turned down portion disposed between adjacent lands;

at least two strain gages disposed on one of said turned down portion 90 degrees apart;

cables extending from said strain gages;

at least one cable run disposed to bring said cables through one of said lands without interfering with the fit between the land and the associated hole;

means for determinng the orientation of the strain gages;

whereby upon insertion of the probe in aligned holes in adjacent plates and by determining the strain registered by the strain gages the amount and direction of misalignment of the holes can be determined.

2. The probe as set forth in claim 1 and further comprising two additional strain gages each disposed 90 degrees from one of the first-mentioned strain gages.

3. The probe as set forth in claim 2 having a cable run for each strain gage.

4. The probe as set forth in claim 1 having a cable run for each strain gage.

5. The probe as set forth in claim 1, wherein the means for determining the orientation of the strain gages is a T-handle aligned with one of the strain gages.

6. The probes as set forth in claim 1, wherein the means for determining the orientation of the strain gage is disposed on one end of the rod and the strain gages are disposed adjacent the portion of the turned down portion nearest said one end.

7. The probe as set forth in claim 6, wherein there are four strain gages disposed 90 degrees apart.

8. The probe as set forth in claim 6, wherein there is a stop disposed adjacent said one end of said probe setting the depth the probe will slide into the first hole in enters.

9. The probe as set forth in claim 1, wherein there is a stop disposed adjacent one end of the probe for setting the depth the probe will slide into the first hole that is enters.

* * * * *